United States Patent [19]

Claverie

[11] Patent Number: 4,699,255
[45] Date of Patent: Oct. 13, 1987

[54] THRUST PLATE SPRING FOR A DISC BRAKE

[75] Inventor: Jean-Claude Claverie, Coubron, France

[73] Assignee: Bendix France, Paris, France

[21] Appl. No.: 860,948

[22] Filed: May 8, 1986

[30] Foreign Application Priority Data

May 30, 1985 [FR] France .............................. 85 08113

[51] Int. Cl.⁴ ............................................ F16D 65/02
[52] U.S. Cl. .................................................. 188/73.38
[58] Field of Search .............. 188/73.35, 73.36, 73.37, 188/73.38

[56] References Cited

U.S. PATENT DOCUMENTS 4,049,087  9/1977  Heinz et al. ...................... 188/78.38
4,333,550  6/1982  Shirai ............................... 188/72.2

FOREIGN PATENT DOCUMENTS 1189333  3/1965  Fed. Rep. of Germany ... 188/73.38
3244790  6/1984  Fed. Rep. of Germany ... 188/73.38
2367221  5/1978  France .

Primary Examiner—Duane A. Reger
Attorney, Agent, or Firm—Larry J. Palguta; Ken C. Decker

[57] ABSTRACT

The invention concerns a thrust plate spring for a disc brake with a caliper (10) sliding on a fixed support (12) comprising a first friction component (14) which is capable of being applied to one surface of a brake disc by means of a brake actuator through a thrust plate (34), and a second friction component which is capable of being applied to the other surface of the disc through the sliding caliper. According to the invention, the spring (64) comprises an elongated metal leaf which is fixed to the thrust plate (34) and which co-operates with an external peripheral portion (80) of the caliper (10) pushing the plate (34) radially outwards by bearing radially against the corresponding surfaces (50) associated with the fixed support (12).

7 Claims, 2 Drawing Figures

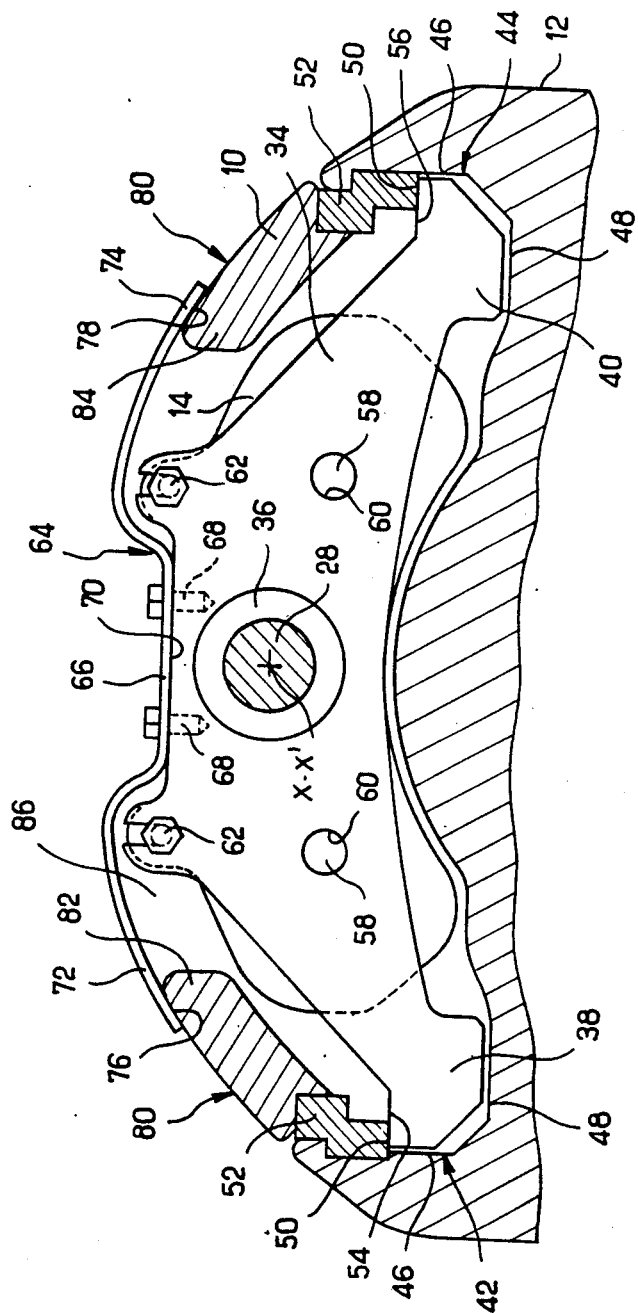
FIG_2

THRUST PLATE SPRING FOR A DISC BRAKE

The present invention relates to a thrust plate spring for a disc brake, intended particularly to equip a motor vehicle.

The invention more particularly relates to a thrust plate spring for a disc brake with a caliper sliding on a fixed support, comprising a first friction component which is capable of being applied to one surface of a brake disc by means of a brake actuator through a thrust plate, and a second friction component which is capable of being applied to the other surface of the disc through the sliding caliper.

A number of disc brakes of this type are known, such as for example that described in French patent application No. 84-17,729 filed by the applicant. This document describes a disc brake in which a brake actuator pushes a friction component through a thrust plate which is guided in grooves formed on the fixed support in two zones which are spaced apart circumferentially owing to the sliding caliper and keys which guide the latter. As the thrust axis of the brake actuator is situated at a greater radius than the line which joins the two grooves, the action of the brake actuator upon the thrust plate causes, firstly, the latter to tilt, and secondly, is capable of causing the projections formed on the thrust plate to jam in the corresponding grooves of the fixed support. Such jamming prevents any proper operation of the brake.

French document No. FR-A-2,526,902 describes a thrust plate which is firmly fixed to the control piston, which, among other things, enables the disadvantages mentioned above to be avoided. However, any rotation of the caliper in a plane which is perpendicular to the plane of the disc, owing to the braking forces or to irregular wear of the friction components, causes large stresses between the cylindrical portion of the thrust plate and the corresponding bore formed in the caliper. Such stresses cause considerable friction which, firstly, can wear the bore and the cylindrical portion and, secondly, can reduce the efficiency of the brake owing to the axial forces to be overcome. The wear or the distortion due to these stresses, which can be very large in the brakes of heavy vehicles, can damage the caliper sufficiently and can render the operation of the latter sufficiently unreliable so as to require replacement of the components.

It is an object of the present invention to provide a thrust plate spring for a disc brake, which is of simple construction and overcomes the disadvantages mentioned above.

According to the present invention there is provided a thrust plate spring for a disc brake with a caliper sliding on a fixed support, comprising a first friction component which is capable of being applied to one surface of a brake disc by means of a brake actuator through a thrust plate, and a second friction component which is capable of being applied to the other surface of the disc through the sliding caliper, characterized in that the spring comprises an elongated metal leaf which is fixed to the thrust plate and which co-operates with an external peripheral portion of the caliper, pushing the said plate radially outwards by bearing radially against the corresponding surfaces associated with the fixed support.

It will be apparent that owing to these features, the thrust plate is no longer capable of jamming in its guides, and as it is independent of the brake actuator it cannot cause damage to the latter.

This spring also allows the axial frictional forces of the thrust plate to be balanced relative to the thrust axis of the brake actuator and thus to avoid any tilting owing to the thrust of the latter.

The present invention will now be described by way of example with reference to the accompanying drawings, in which:

FIG. 2 is a sectional view taken along the line II—II of the brake shown in FIG. 1.

Figure 1:
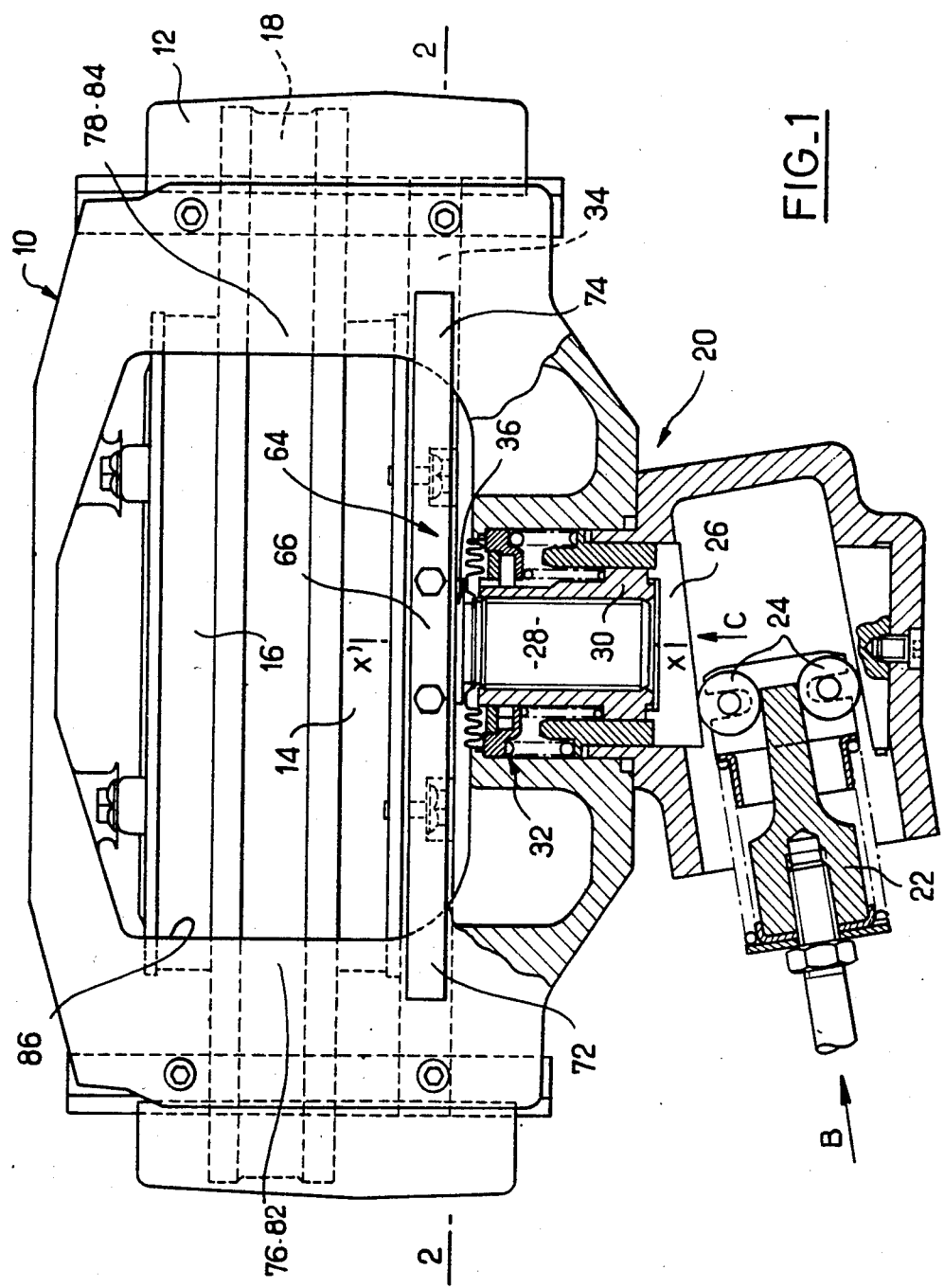
FIG. 1 is a plan view partially sectioned of a disc brake including a spring in accordance with the present invention.

The disc brake illustrated in FIGS. 1 and 2 comprises a caliper, which is given as an assembly the reference 10, which slides on a fixed support 12, which is associated with a fixed portion of the vehicle (not shown). The disc brake comprises two friction components 14 and 16 which are positioned on each side of a brake disc 18. The caliper 10 comprises a brake actuator which is given as an assembly the reference 20, this brake actuator is of the wedge controlled type, that is to say it includes a wedge 22 which is capable of being moved in the direction of the arrow B under the effect of a cylinder, for example, this movement in the direction of the arrow B pushes a sliding component 26 through rollers 24 in the direction of the arrow C. This sliding component 26 is capable of moving a threaded plunger 28 in the direction of the arrow C through a nut 30. The brake actuator 20 is also equipped with an automatic adjustment device which is given as an assembly the reference 32, this automatic adjustment may be of the type described in French Patent No. FR 1,317,919 or in French patent application No. 83-01,438; this automatic adjustment will not be further described. The plunger 28 is capable of pushing a first friction component 14 through a thrust plate 34 by means of an enlarged portion 36 which is positioned on the side of the friction component 14. Referring to FIG. 2, it will be seen that the thrust plate 34 comprises two projections which are circumferentially spaced apart 38 and 40, and which are radially guided by two U-shaped slots 42 and 44, respectively. As shown in FIG. 2, each of the U-shaped slots 42 and 44 has a bottom 46 which lies essentially radially and is formed in the fixed support 12, one of the arms of the U 48 is also formed in the fixed support 12 and lies essentially perpendicular to the bottom 46. The other arm of the U 50 is formed on a guiding key 52 which is intended to guide the caliper 10 relative to the fixed support 12. The projections 38 and 40 have flat portions 54 and 56 positioned so as to face the surfaces 50 of the corresponding keys 52, these surfaces 50 being formed by the arms of the U-shaped slots which are radially furthest from the axis of the disc 18. In a conventional manner, the friction component 14 has projections 58 which enter into holes 60 formed in the thrust plate 34 so as to transmit the braking forces to the latter. In addition, the friction component 14 is firmly fixed to the thrust plate 34 by means of screws 62.

In accordance with the invention, the thrust plate 34 comprises a thrust plate spring 64 which is fixed by a central portion 66 by means of two screws 68 to a peripheral surface 70 of the thrust plate 34. The spring 64, consisting of an elongated metal leaf, includes in addition to the central portion 66 two free ends 72 and 74 which co-operate with two surfaces 76 and 78 formed on an external peripheral portion 80 of the caliper 10.

These surfaces 76 and 78 are formed close to the axially located edges 82 and 84 of an opening 86 which is formed in the arch of the caliper 10. This opening 86 is intended for the removal in a radial direction of the friction components 14 and 16. If the thrust axis of the brake actuator 20 is given the reference XX' it is seen that the latter is essentially positioned centrally between the lines which join, firstly, the bearing surfaces 76 and 78 of the free ends 72 and 74 of the spring 64, and secondly, the surfaces 50 against which the surfaces 54 and 56 of the plate 34 bear under the effect of the spring 64.

The spring 64, when the thrust plate 34 is pushed by the brake actuator 20, generates axial friction, firstly, in the region of the surfaces 76 and 78 and the free ends 72 and 74, and secondly, in the region of the contact between the surfaces 54 and 56 with the surfaces 50 of the keys 52. As these surfaces are essentially symmetrical relative to the thrust axis XX' of the brake actuator 20, there is no risk of the thrust plate 34 being tilted, and thus owing to the spring 64 which pushes the plate 34 radially outward, there is no risk of the latter jamming in the region of the guides, the projections 38 and 40 and the grooves 42 and 44, thus considerably increasing the reliability of the brake.

It is clear that the invention is not limited to the embodiment illustrated, and in particular the brake actuator may be other than a wedge actuator, in the same way the shape of the thrust plate and its guides in the fixed support may be modified without departing from the scope of the present invention. The spring 64 which is the subject of the invention may also have any other shape, which is the case where the friction component 14 is fixed to the thrust plate other than by the screws 62, in this case the spring 64 has no humps so as to avoid the fixing bosses. In the same way, any means other than screws may be used to fix the spring onto the thrust plate.

I claim:

1. A thrust plate spring for a disc brake having a caliper sliding on a fixed support and comprising a first friction component capable of being applied to one surface of a brake disc by means of a brake actuator through a thrust plate connected with the first friction component, and a second friction component capable of being applied to the other surface of the disc by means of the caliper, characterized in that the thrust plate spring comprises an elongated metal leaf which is disposed externally of the caliper and is fixed to the thrust plate which extends into an opening in an arch of the caliper, the spring cooperating with external peripheral portions of the arch of the caliper so as to push the thrust plate radially outwardly and cause the thrust plate to bear radially against associated radially internal surfaces of the fixed support.

2. The spring according to claim 1, characterized in that the spring comprises a central portion fixed to a peripheral surface of the thrust plate and two free ends which cooperate with the peripheral portions of the arch of the caliper.

3. The spring according to claim 2, characterized in that the thrust plate is guided radially by two projections of the plate which cooperate with two U-shaped slots spaced apart circumferentially and with open sides of the slots facing one another, the spring pushing the projections so that the projections bear radially against the internal surfaces which comprise associated slot arms that are disposed radially furtherest from an axis of the disc.

4. The spring according to claim 3, characterized in that the free ends cooperate with two surfaces of the peripheral portions and which are spaced apart circumferentially, the two surfaces formed close to radial edges of the opening in the arch of the caliper.

5. A disk brake of the type comprising a caliper which is mounted slideably on a fixed support and having a spring according to claim 4, characterized in that a thrust axis of a brake actuator is situated essentially centrally between lines which join, firstly, radial bearing surfaces of the thrust plate which engage the associated slot arms, and secondly, the two surfaces of the peripheral portions of the caliper against which bear the two free ends of the spring.

6. The disc brake according to claim 5, characterized in that the fixed support and caliper have keys located therebetween, the associated slot arms disposed on the keys.

7. The disc brake according to claim 5, characterized in that the thrust plate includes a pair of openings which receive projections of the first friction component.

* * * * *